No. 638,373. Patented Dec. 5, 1899.
L. ARNOLD.
KITCHEN CABINET.
(Application filed Aug. 27, 1898.)
(No Model.)
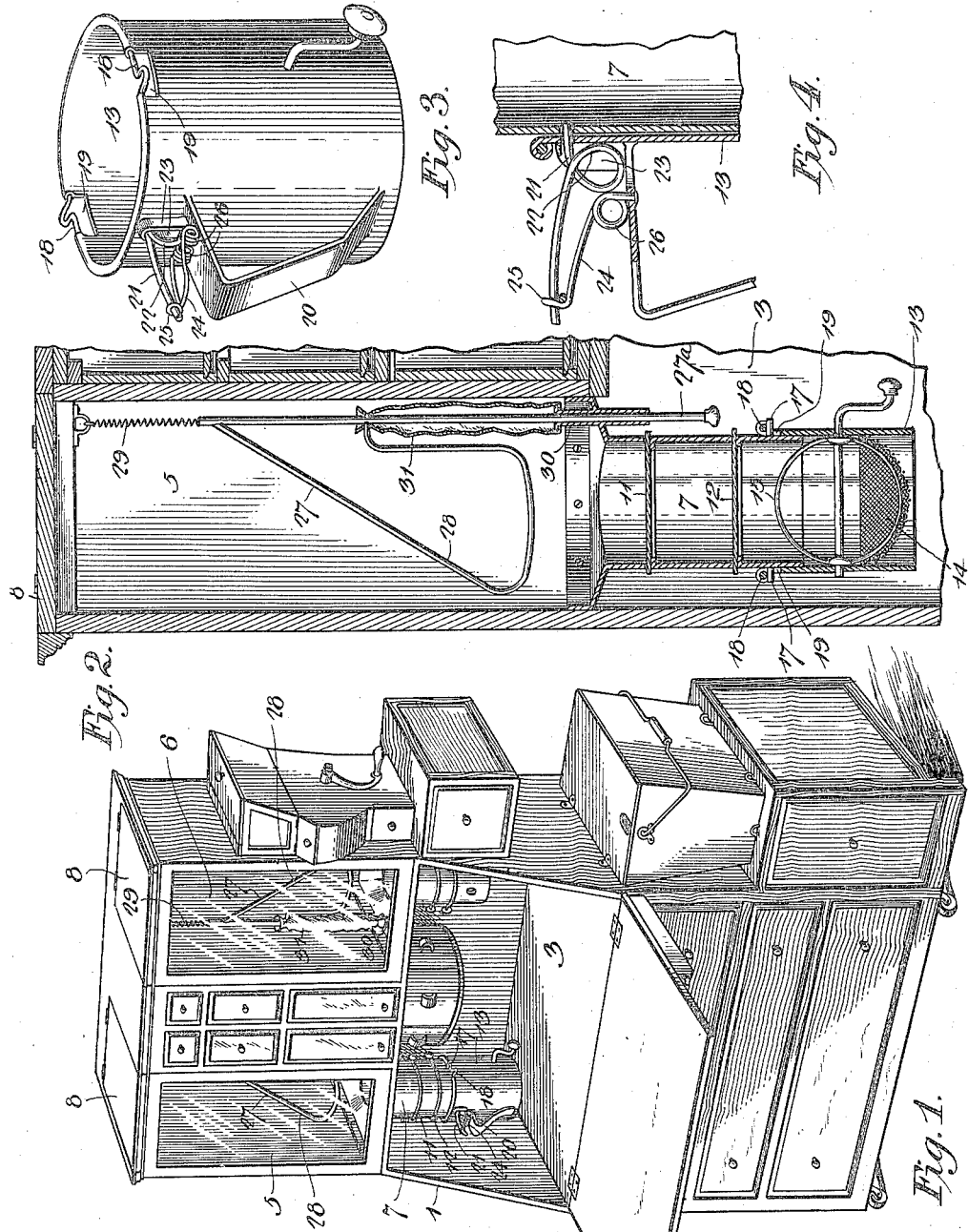
Witnesses
Inventor.
Levi Arnold,
By his Attorneys.

UNITED STATES PATENT OFFICE.

LEVI ARNOLD, OF BLACKWELL, OKLAHOMA TERRITORY.

KITCHEN-CABINET.

SPECIFICATION forming part of Letters Patent No. 638,373, dated December 5, 1899.

Application filed August 27, 1898. Serial No. 689,666. (No model.)

*To all whom it may concern:*

Be it known that I, LEVI ARNOLD, a citizen of the United States, residing at Blackwell, in the county of Kay and Territory of Oklahoma, have invented a new and useful Kitchen-Cabinet, of which the following is a specification.

The invention relates to improvements in kitchen-cabinets.

The object of the present invention is to improve the construction of kitchen-cabinets, more especially the sifting mechanism, and to provide a detachable sifter and to enable the contents of the bins or receptacles to be agitated to prevent flour and other material from caking and remaining therein.

The invention consists in the construction and novel combination and arrangement of parts hereinafter fully described, illustrated in the accompanying drawings, and pointed out in the claims hereto appended.

In the drawings, Figure 1 is a perspective view of a kitchen-cabinet provided with my improvements. Fig. 2 is an enlarged vertical sectional view of the upper left-hand portion of the kitchen-cabinet. Fig. 3 is a detail perspective view of the sifter. Fig. 4 is an enlarged detail sectional view showing the catch of the sifter in engagement with the cylindrical extension of the bin.

Like numerals of reference designate corresponding parts in all the figures of the drawings.

1 designates a cabinet or casing provided at its upper portion with opposite bins or receptacles 5 and 6, designed, respectively, for flour and meal and having depending tapering bottoms extending into a central portion or compartment 3 of the casing or cabinet and provided with cylindrical extensions 7, forming measuring vessels. The bins 5 and 6 are provided with transparent panels, as illustrated in Fig. 1 of the accompanying drawings, so that the condition and quantity of the contents may be seen at a glance, and the said case or cabinet is provided at its top at opposite sides of the center with hinged lids 8, forming covers for the bins or receptacles.

The cylindrical extension 7 of each bin is provided with upper and lower cut-offs 11 and 12, consisting of disks operating in suitable slots and provided with handles. The space between the disks or cut-offs constitutes the measuring-compartment, which may be of any desired capacity, and by opening the up- per cut-off a portion of the contents of the bin or receptacle is permitted to enter the measuring-compartment. The upper cut-off is then closed to shut off the supply of material, and the lower cut-off may then be opened to discharge the measured flour or meal into a sifter 13, which is detachably connected with the extension 7 in order that it may be readily applied to either bin or receptacle. The sifter is provided at its bottom with a sieve 14, and operating in connection with the latter is a rotary agitator 15, of the ordinary construction, provided with an exterior crank-handle. Each cylindrical extension 7, which is adapted to project within the upper portion of the sifter, is provided at opposite sides with projecting lugs 17, adapted to engage the keepers 18 of the sifter. The keepers 18, which are located above recesses or slots 19, are constructed of wire, being preferably formed integral with the wire of the bead of the upper edge of the sifter, and the said keeper consists of a horizontal outwardly-extending bend and a peripheral portion forming a continuation of the upper edge of the sifter. The outward bends of the keepers are adapted to slip over the lugs and permit the same to pass beneath the other portions or shanks of the keepers. The lugs are engaged beneath the shanks of the keepers by slightly rotating the sifter after the said lugs have passed through the bends.

In order to lock the sifter on the cylindrical extensions, it is provided adjacent to its handle 20 with a spring-actuated catch 21, constructed of wire or other suitable material and extending through the sifter and engaging a perforation of the cylindrical extension. The catch is provided adjacent to its engaging inner end with a bearing portion 22, preferably formed by coiling the wire and arranged in a socket 23, consisting of a pair of ears extending from the sifter at a point above the handle 20. The spring 24, which actuates the catch, is substantially U-shaped, being provided at its bend with an eye 25 to receive the outer end of the catch and having spring-coils 26 located at the terminals of the sides and arranged adjacent to the bearing portion of the catch and adapted to retain the same in the socket of the sifter. The catch, which is adapted to be readily operated while grasping the handle of the sifter, may be easily disengaged from the cylindrical extension by depressing it, and it is adapted to engage the perforation of the extension 7 automatically when the sifter is partially rotated to engage the lugs of the keepers.

Each bin or receptacle is provided with a vertically-reciprocating agitator 27, adapted to loosen the contents and consisting of a vertically-movable rod or stem 27ª and an arm 28, consisting of a substantially triangular loop of stout wire or other suitable material, the stem or rod being preferably constructed of wood. The stem, which is maintained normally elevated by a coiled spring 29, is adapted to be reciprocated vertically and also partially rotated, and its lower portion, which extends through a tube or opening of the bottom of the receptacle, is provided with a knob or handle, by means of which the agitator is operated. The coiled spring 29, which is connected to the upper end of the stem and to one of the walls of the bin, not only returns the agitator to its normal position, but also permits the same to have a limited rotary movement.

The bottom of the bin is preferably provided with a short tube 30 to receive the stem, and in order to prevent flour or meal from sifting through the said tube a flexible sleeve 31, of fabric or other suitable material, is employed. The flexible sleeve, which extends around the tube and the stem, has its ends secured to those parts, and it is adapted to permit the reciprocating and rotary movement of the device, and at the same time it is capable of excluding flour or meal from the tube. The arm or loop of the agitator has a depending portion or lobe which is adapted to extend into the tapering bottom portion of the bin or receptacle, so that any flour or meal adhering to the same may be readily dislodged. The loop consists of an inclined upper portion, a slightly-inclined bottom portion, and a vertical lower inner portion which extends from the bottom portion of the loop to the point of attachment of the upper end of the flexible sleeve.

It will be apparent that the sifter may be quickly transferred from one bin or receptacle to the other and that an efficient agitator is provided to prevent flour or meal from caking and lodging in the bins or receptacles.

What is claimed is—

1. In a device of the class described, the combination of a bin or receptacle provided with an extension, a sifter having a handle and adapted to engage the extension, a socket mounted on the sifter, above the handle, a catch extending through the sifter to engage the extension, and provided with a bearing portion fitting in the socket, and a spring mounted on the handle and connected with the outer portion of the catch, substantially as described.

2. In a device of the class described, the combination of a bin or receptacle provided with a cylindrical extension, a sifter adapted to engage the extension and provided with a handle, said sifter having a socket above the handle consisting of outwardly-extending ears, a catch extending through the sifter and adapted to engage the cylindrical extension and provided between its ends with a bearing portion fitting in the socket, and a substantially U-shaped spring provided at its bend with an eye to receive the outer end of the catch, and having spring-coils arranged at the terminals of its sides and engaging the bearing portion of a catch to retain the same in the socket, substantially as described.

3. In a device of the class described, the combination of a bin or receptacle, a vertically-reciprocating agitator mounted in the bin or receptacle and capable of rotating therein, said agitator being provided with an exteriorly-arranged handle, and a coiled spring supporting the agitator in an elevated position and permitting the same to rotate, substantially as described.

4. In a device of the class described, the combination of a bin or receptacle having a tapering bottom portion, a vertically-reciprocating agitator capable of a limited rotary movement and provided with an arm for stirring the contents of the bin or receptacle, said arm consisting of the loop having a depending lobe adapted to project downward into the tapering portion of the bin or receptacle, and a coiled spring supporting the agitator and permitting the same to rotate, substantially as described.

5. In a device of the class described, the combination of a bin or receptacle having an opening at its bottom and provided with a short inwardly-projecting tube, an agitator having a stem extending through the tube, and a flexible sleeve arranged on the tube and the adjacent portion of the stem and secured at its ends to the said parts to exclude the contents of the bin or receptacle from the tube, said sleeve being adapted to yield to the reciprocating and rotary movements of the agitator, substantially as described.

6. In a device of the class described, the combination of a bin or receptacle having a tapering lower portion, an agitator extending through the said lower portion and composed of a stem, and a loop consisting of an inclined outer side, a lower portion extending inward from the outer side, and an inner vertical side attached to the stem at a point above the lower portion of the loop, whereby the latter is adapted to extend into the tapering portion of the bin or receptacle, and a coiled spring supporting the agitator in an elevated position and permitting the same to rotate, substantially as described.

In testimony that I claim the foregoing as my own I have hereto affixed my signature in the presence of two witnesses.

LEVI ARNOLD.

Witnesses:
  W. C. TELINIK,
  JOHN R. TATE.